United States Patent Office 3,148,196
Patented Sept. 8, 1964

3,148,196
N-(4-ANILINOPHENYL)MALEIMIDE
Elbert C. Ladd, Passaic, N.J., assignor to United States Rubber Company, New York, N.Y., a corporation of New Jersey
No Drawing. Filed May 17, 1962, Ser. No. 195,413
1 Claim. (Cl. 260—326.5)

This invention relates to a new chemical compound, namely N-(4-anilinophenyl)maleimide, and to the method of preparing same.

The subject compound, N-(4-anilinophenyl)maleimide, is represented by the formula:

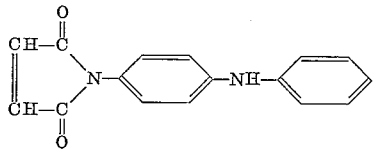

According to the invention, said N-(4-anilinophenyl)-maleimide can be prepared by a two-step process in which maleic anhydride is reacted with N-phenyl-p-phenylenediamine to yield p-anilinomaleanilic acid, which is in turn converted to N-(4-anilinophenyl)maleimide with sodium acetate and acetic anhydride. The reactions may be illustrated as follows:

Step 1:

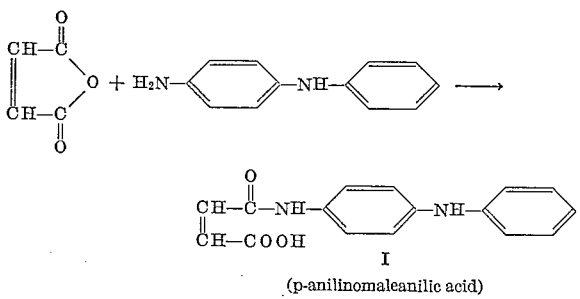

(p-anilinomaleanilic acid)

The reaction of Step 1 is most easily carried out by bringing together approximately equimolar amounts of the two reagents in an inert solvent for both. Convenient solvents are dioxane and 50/50 mixtures by volume of dioxane and benzene, which are good solvents for both reactants but poor solvents for the reaction product. The reaction is most conveniently carried out at ambient temperatures. The product separates out as an orange solid which may be filtered off, washed with benzene and dried.

Step 2:

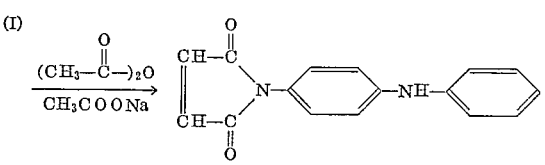

The reaction of Step 2 effects dehydration and ring formation in the maleamic acid moiety. The reaction may be carried out by heating the p-anilinomaleanilic acid obtained from Step 1 with a considerable molar excess (over said acid) of acetic anhydride and a suitable amount of sodium acetate at an elevated temperature of about 60–80° C. for a suitable period of time. Typically, the molar ratio of acetic anhydride to the p-anilinomaleanilic acid ranges from 3:1 to 15:1 and the molar ratio of acetic anhydride to sodium acetate ranges from 2:1 to 15:1. The reaction mixture is poured into water whereupon a dark red precipitate of N-(4-anilinophenyl)maleimide is obtained. This precipitate can be purified by recrystallization from benzene.

The compound of this invention may be used as an antioxidant in rubbers.

The following examples illustrate the invention:

Example I 36.8 grams (0.2 mole) of N-phenyl-p-phenylenediamine was placed in a 500 ml. flask containing 100 ml. of dioxane. To this solution was added 19.6 grams (0.2 mole) of maleic anhydride in 100 ml. of benzene. An orange colored precipitate was formed which was filtered off, washed with benzene and dried. The product yield was 38 grams of p-anilinomaleanilic acid. 25 grams (0.09 mole) of this acid was then reacted with 5.4 grams (.06 mole) of sodium acetate and 90 grams (1.1 moles) of acetic anhydride by heating the mixture on a steam bath to 70° C. for 10 minutes. The reaction mixture was then poured into water and the precipitate thus formed was washed with water and air dried yielding 23 grams of product (dark red in color) having a melting range of 145°–155° C. The material, N-(4-anilinophenyl)maleimide, was recrystallized from benzene and had a melting point of 161°–163° C.

Analysis.—$C_{16}H_{12}N_2O_2$; percent N calculated=10.61; percent N found=10.44.

Example II

This example demonstrates the use of N-(4-anilinophenyl)maleimide as an antioxidant in rubber stocks, particularly Hevea rubber stocks. Natural rubber (smoked sheet #2) was compounded conventionally with filler and pigment in standard sulfur-accelerator recipes containing 2.0 parts of N-(4-anilinophenyl)maleimide. By way of comparison, similar stocks were prepared by replacing this compound, in one case, with a well-known antioxidant combination such as BLE and JZF, and, in the other case, with no antioxidant. All the ingredients except the sulfur and accelerator were assembled and mixed in the Banbury. Discharge temperature was 275°–300° F. The sulfur and accelerator were added on a cool two-roll mill. All stocks were cured in a press at 293° F. and tested by the conventional testing methods used for rubber.

| Stock | 1 | 2 | 3 |
|---|---|---|---|
| Smoked sheet #2 | 100.0 | 100.0 | 100.0 |
| High abrasion furnace carbon black | 45.0 | 45.0 | 45.0 |
| Stearic acid | 2.0 | 2.0 | 2.0 |
| Zinc oxide | 3.0 | 3.0 | 3.0 |
| Asphaltum | 6.0 | 6.0 | 6.0 |
| N-Cyclohexyl-2-benzothiazole sulfenamide (accelerator) | 0.75 | 0.75 | 0.75 |
| Sulfur | 2.75 | 2.75 | 2.75 |
| BLE [a] | 2.0 | | |
| JZF [b] | 0.35 | | |
| N-(4-anilinophenyl)-maleimide | | 2.0 | |

[a] Reaction product of acetone and diphenylamine (marketed by Naugatuck Chem. Div., U.S. Rubber Co.).
[b] N,N′-diphenyl-p-phenylenediamine (marketed by Naugatuck Chem. Div., U.S. Rubber Co.).

The following table shows the results of tests made on the cured stocks before and after aging in air and in the presence of oxygen.

| Physical Properties | 1 | 2 | 3 |
|---|---|---|---|
| Unaged: | | | |
| Tensile Strength (p.s.i.)— | | | |
| 30' | 4,350 | 4,165 | 4,255 |
| 45' | 4,170 | 4,075 | 4,210 |
| 90' | 3,865 | 3,705 | 3,875 |
| Elongation @ Break— | | | |
| 30' | 550 | 600 | 520 |
| 45' | 540 | 570 | 530 |
| 90' | 560 | 590 | 510 |
| Modulus @ 200% (p.s.i.)— | | | |
| 30' | 775 | 640 | 850 |
| 45' | 725 | 610 | 800 |
| 90' | 625 | 575 | 725 |
| Aged in Air—72 hrs. @ 212° F.: | | | |
| Tensile Strength (p.s.i.)— | | | |
| 30' | 1,710 | 2,005 | 1,330 |
| 45' | 1,710 | 1,775 | 1,155 |
| 90' | 1,635 | 1,680 | 1,265 |
| Elongation @ Break Percent— | | | |
| 30' | 230 | 320 | 230 |
| 45' | 220 | 290 | 230 |
| 90' | 250 | 320 | 270 |
| Modulus @ 200% (p.s.i.)— | | | |
| 30' | 1,325 | 1,025 | 1,000 |
| 45' | 1,275 | 950 | 950 |
| 90' | 1,075 | 800 | 850 |
| Aged—96 hrs. in Oxygen Bomb: | | | |
| Tensile Strength (p.s.i.)— | | | |
| 30' | 2,900 | 2,665 | 935 |
| 45' | 2,315 | 2,375 | 870 |
| 90' | 2,315 | 2,295 | 1,630 |
| Elongation @ Break (Percent)— | | | |
| 30' | 420 | 480 | 310 |
| 45' | 370 | 450 | 300 |
| 90' | 380 | 440 | 360 |
| Modulus @ 200% (p.s.i.)— | | | |
| 30' | 975 | 725 | 550 |
| 45' | 950 | 675 | 570 |
| 90' | 835 | 675 | 625 |
| Aged—144 hrs. in Oxygen Bomb: | | | |
| Tensile Strength (p.s.i.)— | | | |
| 30 | 2,275 | 1,935 | 355 |
| 45 | 2,010 | 1,565 | 530 |
| 90 | 1,835 | 1,670 | 870 |
| Elongation @ Break (Percent)— | | | |
| 30' | 360 | 420 | 180 |
| 45' | 340 | 380 | 230 |
| 90' | 340 | 390 | 280 |
| Modulus @ 200% (p.s.i.)— | | | |
| 30' | 925 | 655 | 300 |
| 45' | 890 | 620 | 315 |
| 90' | 780 | 625 | 375 |

Having thus described my invention, what I claim and desire to protect by Letters Patent is:

N-(4-anilinophenyl)maleimide.

References Cited in the file of this patent

UNITED STATES PATENTS 2,444,536    Searle    July 6, 1948
3,053,851    Ladd    Sept. 11, 1962